Figure 1:
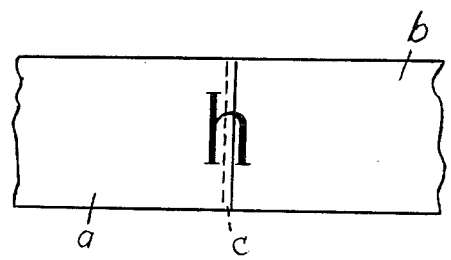

Nov. 19, 1963  W. GRÜNDEL  3,111,441
METHOD OF PRODUCING AN ENDLESS TYPEWRITER RIBBON
Filed March 13, 1957

INVENTOR
WILLY GRÜNDEL
BY Richards & Geier
ATTORNEYS

United States Patent Office 3,111,441
Patented Nov. 19, 1963

3,111,441
METHOD OF PRODUCING AN ENDLESS
TYPEWRITER RIBBON
Willy Gründel, Hannover, Germany, assignor to Günther
Wagner, Hannover, Germany, a firm
Filed Mar. 13, 1957, Ser. No. 645,708
Claims priority, application Germany Mar. 20, 1956
1 Claim. (Cl. 156—157)

The invention relates to a method of producing an endless ribbon, especially a typewriter ribbon by joining the ends of a plain ribbon, and consists in that a filament of thermoplastic resinous material is placed on the end of the ribbon near the severance line, the other end of the ribbon is laid with an overlap, which is narrower than the actual height or breadth of the type of the machine, on to the thermoplastic resinous filament, and the three-layer joint thus formed is welded by the application of heat.

Various constructions of endless ribbons are known, especially ribbons for typewriters or other machines in which characters are reproduced by type striking a ribbon saturated with ink. There are endless woven ribbons, plain ribbons sewn at their ends to form endless ribbons, and ribbons adhered at their ends to form an endless ribbon, the sticking being effected by means of ordinary adhesives or thermoplastic foils. Both in the case of sewn and adhered endless ribbons, the overlap must always be relatively wide in view of the necessary durability and consequently they easily produce smeared and illegible impressions when the ribbon becomes worn. As the endless ribbons are of relatively short length, the interengaging ends of the ribbon are often engaged by the type, so that the defective impressions are frequently repeated.

It has now been found that perfectly operating endless ribbons can be obtained if the ends of the ribbons are, according to the invention, joined by an overlap which is narrower than the actual height of the type when the ribbon runs through the machine vertically and narrower than the actual width of the type when the ribbon runs horizontally through the machine. By this means the impression of a whole type is never lacking or smeared, but at the most only a certain relatively small portion of any individual type, which happens to strike the overlap, produces an unclear impression, so that a clear legible writing is produced even at the overlap point.

To obtain such a narrow overlap has first become possible by using a filament or thread of thermoplastic resinous material, because this enables the greatest possible quantity of adhesive to be concentrated on a very small area and ensures an absolutely securely stuck seam.

In order to protect the fabric as much as possible, it is advisable to use a thermoplastic filament which acts as a plastic adhesive or welding medium at temperatures which do not damage the fabric of the ribbon.

Polyamide comes primarily into question as a thermoplastic material. To obtain firm adhesion along the joint seam, the thermoplastic resinous filament is preferably laid on the seam under tension. The thickness of the filament will depend upon the width of the overlap which is to be kept as narrow as possible; measurements of less than 1 millimeter normally coming into question. Round filament is generally used, but it is evident that filament of any other section can be chosen.

Figure 2:
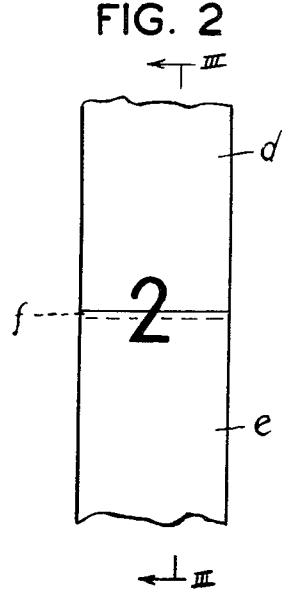

Two embodiments of the invention are illustrated by way of example in the accompanying drawing, in which FIG. 1 shows a joint seam of a typewriter ribbon to be guided in horizontal direction, and FIG. 2 is a similar view of a joint seam of a typewriter ribbon to be guided in vertical direction.

Figure 3:
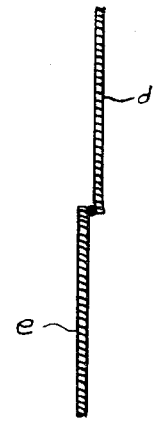

FIG. 3 is a section along the line III of FIG. 2 on an enlarged scale.

In FIG. 1 the two ribbon ends $a$ and $b$ are connected by a welded overlap $c$ which is narrower than the width of the letter "$h$" shown by way of example. In FIG. 2 the two ribbon ends are designated by $d$ and $e$ and the overlap by $f$, which is narrower than the height of the figure "2" taken in this case by way of example.

I claim:

A method of manufacturing an endless typewriter ribbon, said method comprising the steps of placing a straight stretched length of a single filament of thermoplasic resinous material close to the edge of a severance end of a length of ribbon, placing a substantially small overlap of the other end of said ribbon which is less than the width of a typewriter letter over the stretched filament and permanently joining together the two ends of the ribbon along with said small overlap by heating, said filament being melted after the heating.

References Cited in the file of this patent

UNITED STATES PATENTS

| | | |
|---|---|---|
| 2,130,948 | Carothers | Sept. 20, 1938 |
| 2,201,416 | Wagner | May 21, 1940 |
| 2,367,725 | Lindh et al. | Jan. 23, 1945 |
| 2,384,462 | Goodman | Sept. 11, 1945 |
| 2,495,761 | Platt | Jan. 31, 1950 |
| 2,510,727 | Sussenbach | June 6, 1950 |
| 2,561,894 | Wallach | July 24, 1951 |
| 2,578,664 | Beery | Dec. 18, 1951 |
| 2,593,090 | Bartosz | Apr. 15, 1952 |
| 2,728,439 | Murphy et al. | Dec. 27, 1955 |
| 2,793,153 | Grundel | May 2, 1957 |
| 2,858,090 | Winzen | Oct. 28, 1958 |

FOREIGN PATENTS

| | | |
|---|---|---|
| 545,532 | Great Britain | June 1, 1942 |
| 153,620 | Australia | Oct. 14, 1953 |